United States Patent [19]
Bauer

[11] 4,217,218
[45] * Aug. 12, 1980

[54] REMOVAL OF SOLIDS FROM A WET OXIDATION REACTOR

[75] Inventor: Gerald L. Bauer, Rothschild, Wis.

[73] Assignee: Sterling Durg Inc., New York, N.Y.

[*] Notice: The portion of the term of this patent subsequent to Feb. 13, 1996, has been disclaimed.

[21] Appl. No.: 78

[22] Filed: Jan. 2, 1979

Related U.S. Application Data

[63] Continuation-in-part of Ser. No. 864,497, Dec. 27, 1977, Pat. No. 4,139,461.

[51] Int. Cl.$^2$ .................................................. C02B 1/34
[52] U.S. Cl. ................................... 210/63 R; 210/71; 165/2; 165/95

[58] Field of Search .................... 165/95, 2; 210/63 R, 210/63 Z, 71, 177, 181, 199, 1, 205, 206, 209, 220, 198 R; 134/22 R, 22 C, 36

[56] References Cited

U.S. PATENT DOCUMENTS

| | | | |
|---|---|---|---|
| 3,272,740 | 9/1966 | Gitchel | 210/181 |
| 3,464,917 | 9/1969 | Porteous | 210/71 |
| 3,647,687 | 3/1972 | Matthiesen | 210/63 R |
| 3,697,417 | 10/1972 | Teletzke | 210/71 |
| 3,737,382 | 5/1973 | Fletcher | 210/177 |
| 3,808,126 | 4/1974 | Pradt | 210/63 R |
| 4,139,461 | 2/1979 | Bauer | 210/71 |

Primary Examiner—Ernest G. Therkorn
Attorney, Agent, or Firm—Charles R. Fay

[57] ABSTRACT

A cleaning and washing system for a reactor utilizing a by-pass, normally closed, to be opened while the normal flow of sludge is closed, for washing out unwanted solid particles in the reactor.

4 Claims, 1 Drawing Figure

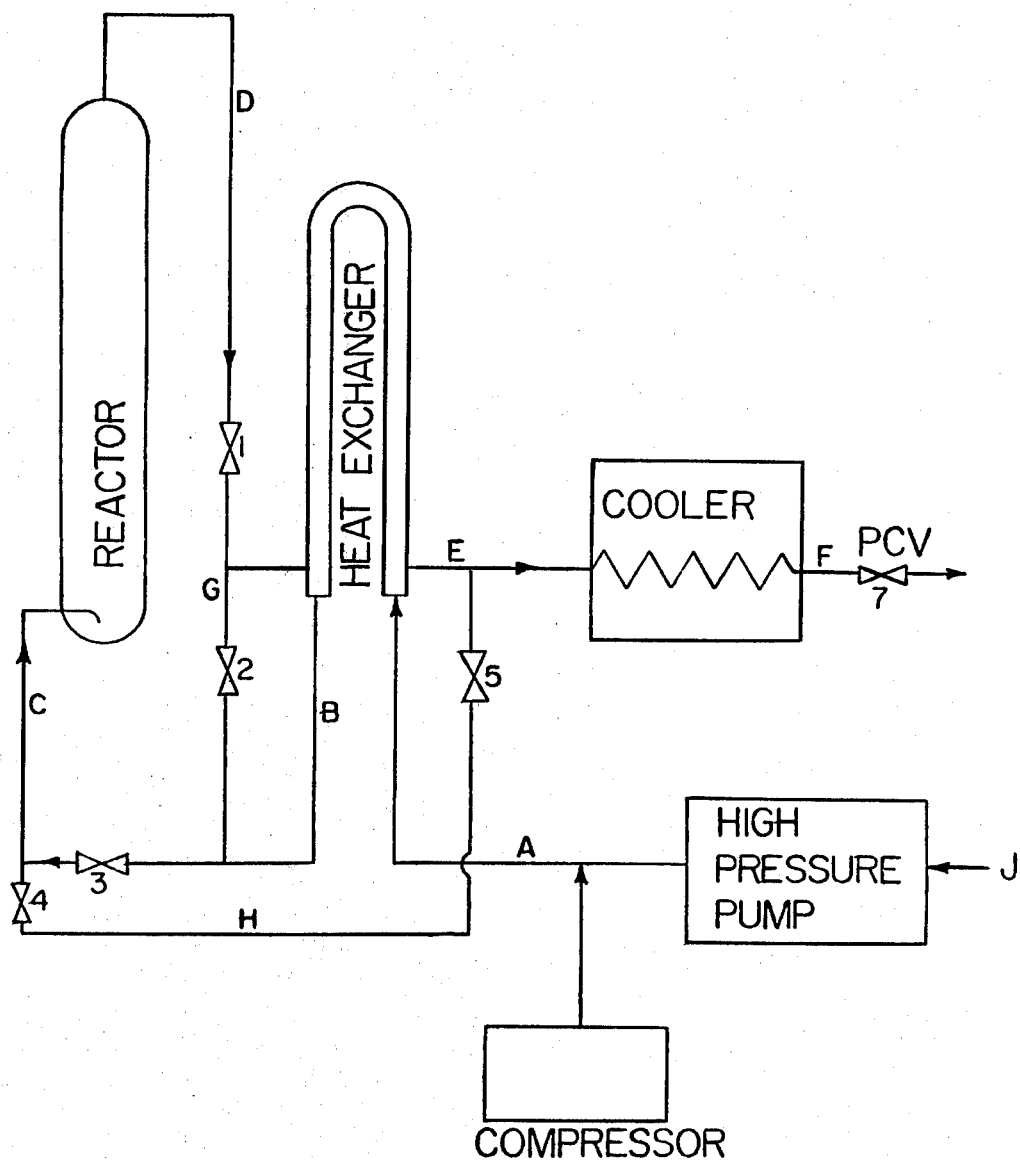

REMOVAL OF SOLIDS FROM A WET OXIDATION REACTOR

REFERENCE TO RELATED APPLICATION

This is a continuation-in-part of application Ser. No. 864,497 filed Dec. 27, 1977, now U.S. Pat. No. 4,139,461.

BACKGROUND OF THE INVENTION

During the operation of a wet oxidation system, concentrations of inert solid particles often build up in the reactor. These particles may flow into the reactor slurried with the feed, or may be formed by chemical reaction or agglomeration within the reactor. Unless removed from the reactor, these particles may gradually build up on the bottom of the reactor and may eventually fill the entire reactor.

DISCUSSION OF THE PRIOR ART

Several methods have been proposed for removing these solids from the reactor. Conventional practice has been to shut down the wet oxidation system, completely drain the reactor, and then physically remove the solids. U.S. Pat. No. 3,808,126, dated Apr. 30, 1974, discloses a method for removing solids from a wet oxidation reactor while it is in operation. This method has not, however, been fully implemented in a full scale wet oxidation system.

U.S. Pat. No. 3,647,687, dated Mar. 7, 1972, shows a portion of the present system, and uses a solvent wash by-pass.

SUMMARY OF THE INVENTION

The present invention provides a method for the periodic removal of solids from a wet oxidation reactor, with only a temporary suspension of feed to the plant, without draining the entire liquid portion of the reactor contents, and without having to cool the reactor contents. Thus, immediately after the short period required for solids removal, according to this invention, the wet oxidation system may be returned to normal operation. Another feature of the invention is that wear of the valves in the wet oxidation system is reduced.

BRIEF DESCRIPTION OF THE DRAWING

The drawing is a diagram illustrating the invention.

PREFERRED EMBODIMENT OF THE INVENTION

The attached FIGURE illustrates the invention, showing a wet oxidation system and the pipeline and valves which are part of the invention. Referring to the drawing, the normal operation of the wet oxidation unit is described below.

Waste sludge is pumped by the high pressure pump into line A where it is mixed with an oxygen-containing gas from the compressor. The air-sludge mixture then passes through a heat exchanger comprising the usual shell and tube structure, where it is preheated against hot effluent from the reactor, then through lines B and C, and into the reactor where oxidation of the organic substances in the sludge takes place. Alternately, the air may be introduced into the sludge at lines B or C, or even in the reactor itself. Solid particles, either suspended in the raw sludge, or formed in the reactor, settle to the bottom of the reactor while the oxidized sludge and gas phase pass out of the reactor through line D, through the shell side of the heat exchanger through line E to the cooler and then through the pressure control valve 7 in line F, and finally out of the wet oxidation system. Valves 1 and 3 are normally open and valves, 2, 4 and 5 are normally closed.

At some time during the operation of the system, the amount of solid particles in the reactor may increase to an unacceptable level. The following describes the equipment and procedure required for the removal of solids according to this invention:

Referring again to the FIGURE, the new components of the wet oxidation system required as part of this invention are valves 4 and 5 and line H. Valves 1, 2 and 3 and line G are the components of the solvent wash by-pass disclosed in U.S. Pat. No. 3,647,687, dated Mar. 7, 1972. A special use of these valves is included, however, as part of the present invention. The cooler shown in the present case may not be included in every wet oxidation system. While the preferred use of the invention is with a wet oxidation unit that has a cooler, the invention may be practiced in a system that has none.

When the amount of solids in the reactor builds to a level at which removal is required, the following procedure is instituted:

1. The line J to the high pressure pump is switched from waste sludge to water.
2. Flow of high pressure air or oxygen containing gas from the compressor may or may not be stopped. It is preferred that the flow be stopped.

Valves 1 and 3 are closed and valve 2 is opened.

4. When all solids have been flushed from the heat exchanger and cooler, it is preferred that the setting of the pressure control valve be adjusted so that the pressure at the intersection of lines E and H is the same as the pressure in the reactor.
5. Valves 3, 4 and 5 are then opened, and valve 2 is shut. Little or no flow will occur from the reactor as there is no pressure gradient.
6. The pressure setting on the pressure control valve is then lowered from e.g. 50 to 500 psig, and preferably, at small intervals of 50 to 100 psig. This allows a concentrated slurry containing the solids from the reactor to flow out of the bottom portion of the reactor through line C, to be mixed with cold water in line H and flow to line E. The slurry is optionally cooled further prior to discharge through the pressure control valve 7. The mixing of the hot slurry and cold water cools the mixture and prevents excessive wear in the pressure control valve, both by diluting the solids concentration and lowering the temperature of the slurry flowing through the valve. The cooler, which may or may not be included in the wet oxidation plant, further serves to cool the effluent and reduce control valve wear. The water addition and cooler also serve to prevent flashing of the concentrated slurry from the reactor downstream of the pressure control valve.

As the pressure in the reactor approaches the pressure setting at the "pressure control valve", the flow of the slurry from the reactor slows and then stops. If insufficient solids have been removed from the reactor, the setting of the PCV is lowered another 50 to 500 psig, preferably about 50 to 100 psig, and another portion of the reactor contents is allowed to flow through line H. If sufficient solids have been removed from the reactor by this procedure, the wet oxidation system may be restarted according to the following procedure:

1. Valves 4 and 5 are closed and valve 1 is opened returning the wet oxidation unit to its normal flow configuration.
2. Flow to the high pressure pump is switched from water to waste sludge.
3. Flow of high pressure air or oxygen containing gas is started from the compressor.
4. The pressure control valve is adjusted to its setting for normal plant operation.

Suitable modifications of the above procedure are evident if either a total system shut down with complete emptying of the reactor is desired, or if only a temporary shut down of the system is desired with as much as possible of the hot liquid in the reactor remaining at high temperature and pressure until start-up at a later date.

I claim:

1. A process for discharging unwanted slurried solids accumulation from a wet air oxidation system for conditioning or oxidizing sludge, which system includes a pressurized sludge flow through the cold side of a heat exchanger to the inlet of a reactor; the reactor effluent passing from the outlet of the reactor through the hot side of the heat exchanger to an adjustable pressure control valve; a normally open valved line between the outlet of the cold heat exchanger side and the reactor inlet; a normally opened valved line between the inlet of the hot heat exchanger side and the reactor outlet, and a normally closed, valved line connecting the outlet of the cold heat exchanger side with the inlet of the hot heat exchanger side, wherein said process comprises changing the sludge flow to an alternate clear flushing water source while isolating the reactor from the heat exchanger by closing at least the valve in the line between the reactor outlet and the hot heat exchanger side inlet and opening the valve in the line between the cold heat exchanger side outlet and the hot heat exchanger side inlet, characterized by the fact that the system includes a normally closed valved line communicating the bottom portion of the reactor to a point upstream from the pressure control valve, but downstream from the heat exchanger, and after water has flowed between the heat exchanger and the pressure control valve, opening the valve between the cold heat exchanger side outlet and the reactor inlet, closing the valve between the cold heat exchanger side outlet and the hot heat exchanger side inlet, opening the valve in the line communicating the bottom portion of the reactor with the point between the heat exchanger and the pressure control valve and reducing the setting on the pressure control valve to below the pressure in the reactor, thereby allowing unwanted slurried solids to flow from the reactor and be mixed with, diluted by and cooled by the flush water stream prior to flushing from the system through the pressure control valve.

2. A process according to claim 1 characterized by the fact that a tubular heat exchanger is used and the cold side of the heat exchanger comprises the inner tubes of the heat exchanger and the hot side of the heat exchanger comprises the heat exchanger shell.

3. A process according to claim 1 characterized by passing the flush water solid slurry mixture through a cooler immediately prior to passing said mixture through the pressure control valve.

4. A process according to claim 1 wherein a normal operating flow of pressurized oxygen containing gas to the system is temporarily stopped while the solids removal operations take place.

* * * * *

UNITED STATES PATENT AND TRADEMARK OFFICE
CERTIFICATE OF CORRECTION

PATENT NO. : 4,217,218
DATED : August 12, 1980
INVENTOR(S) : Gerald L. Bauer

It is certified that error appears in the above-identified patent and that said Letters Patent are hereby corrected as shown below:

Cover page, [73] Assignee, "Durg" should read --Drug--.

Column 2, line 31, insert "3." before --Valves--.

Column 4, line 5, Claim 1, insert a comma (,) after "closed".

Signed and Sealed this

Sixth Day of January 1981

[SEAL]

Attest:

SIDNEY A. DIAMOND

Attesting Officer

Commissioner of Patents and Trademarks